Figure 1:
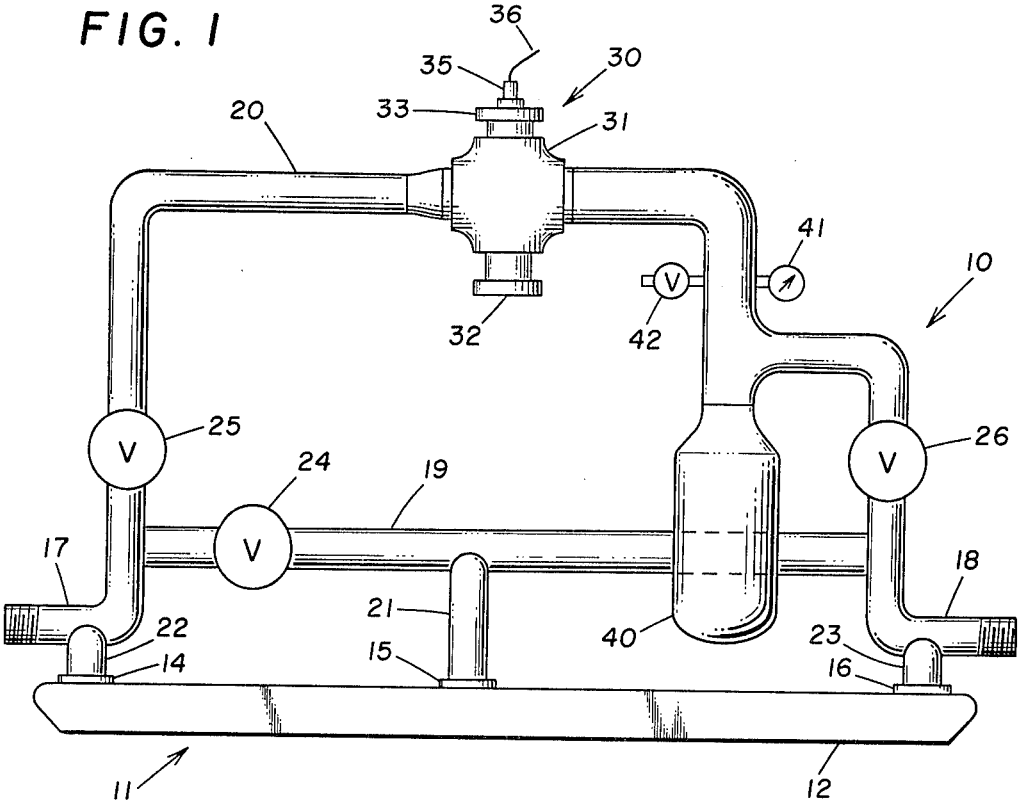
Figure 2:
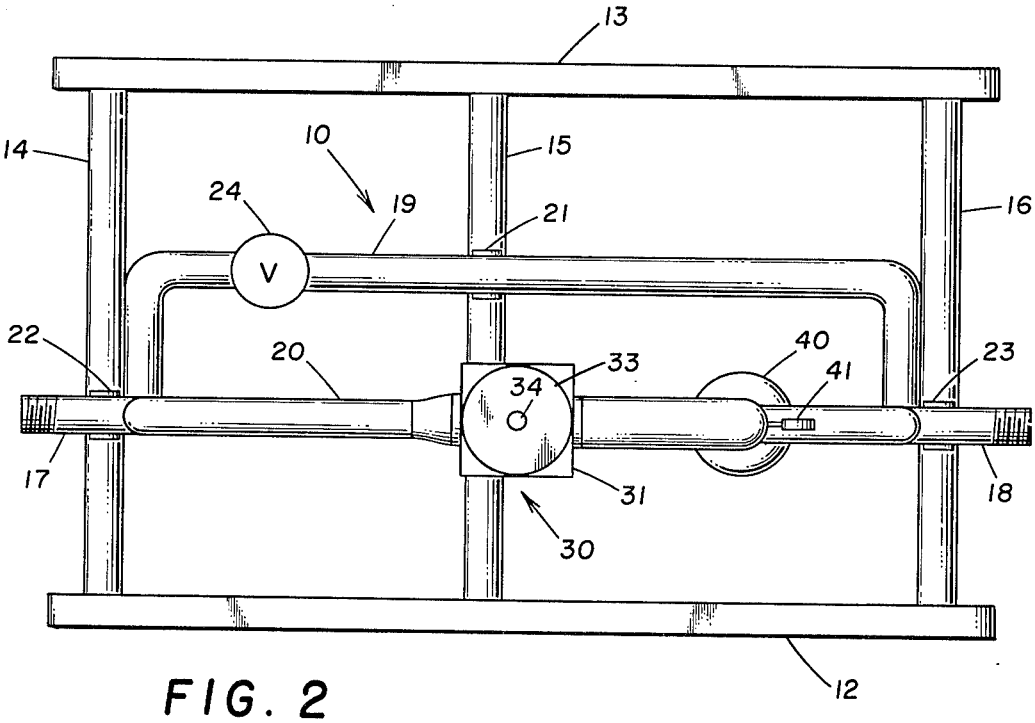

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 10

T939,012

MANIFOLD FOR FLOW MONITORING MEANS

Willett F. Baldwin, Dallas, and Vasel R. Slover, Jr., Irving, Tex., assignors to Mobil Oil Corporation

Filed May 22, 1974, Ser. No. 472,336

**Int. Cl. G01n *15/06***

U.S. Cl. 137—599.1

1 Sheet Drawing. 8 Pages Specification

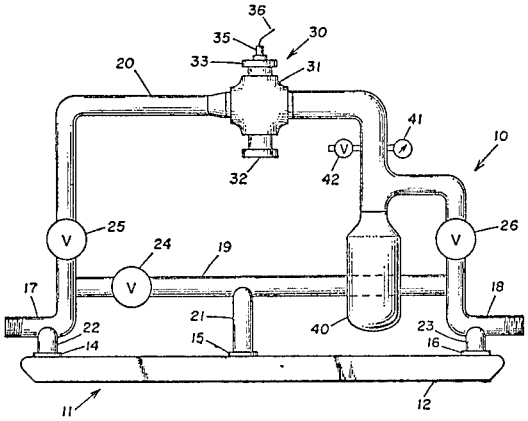

A manifold for mounting a monitoring device, e.g., sand detection probe, in a production flowstream of an oil and/or gas well. The manifold is adapted to be connected into said production flowstream and has a first flowline and a second flowline, the latter forming a bypass of said first flowline. A special fitting is provided in the second flowline by which the monitoring device may be removably mounted into the interior of the second flowline. By appropriate valving, flow can be directed through either the first or the second flowline so that the probe in the second flowline may be isolated from flow to allow the probe to be replaced without requiring the entire production of the well to be shut in.

MANIFOLD FOR FLOW MONITORING MEANS

Original Filed May 22, 1974